Feb. 27, 1951 J. W. VAN RIPER 2,543,679
EXTRUSION APPARATUS
Filed Nov. 27, 1948 2 Sheets-Sheet 1
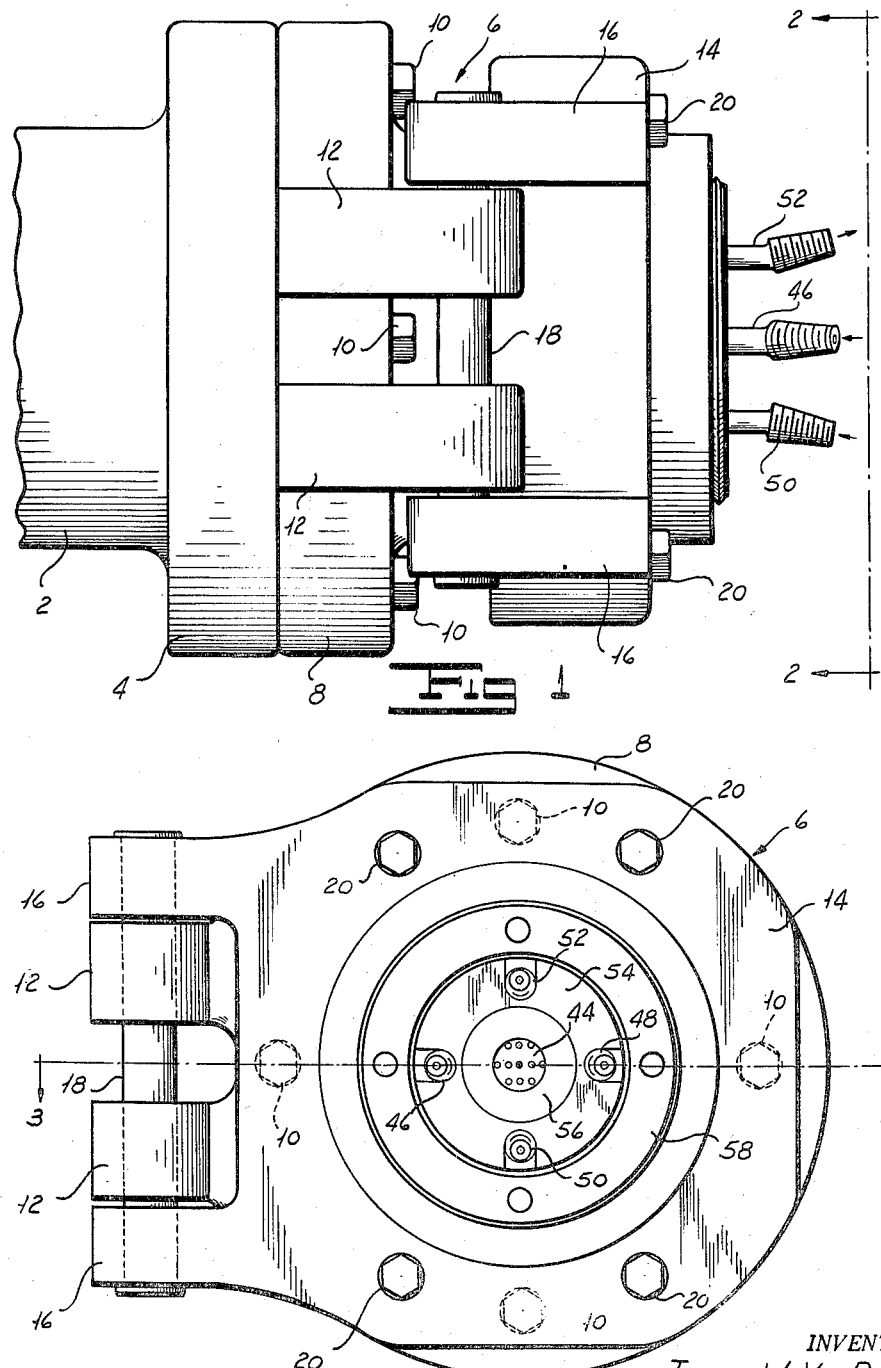
INVENTOR.
JURIAN W. VAN RIPER
BY Alfred W. Vibber
ATTORNEY Feb. 27, 1951    J. W. VAN RIPER    2,543,679
EXTRUSION APPARATUS
Filed Nov. 27, 1948    2 Sheets-Sheet 2
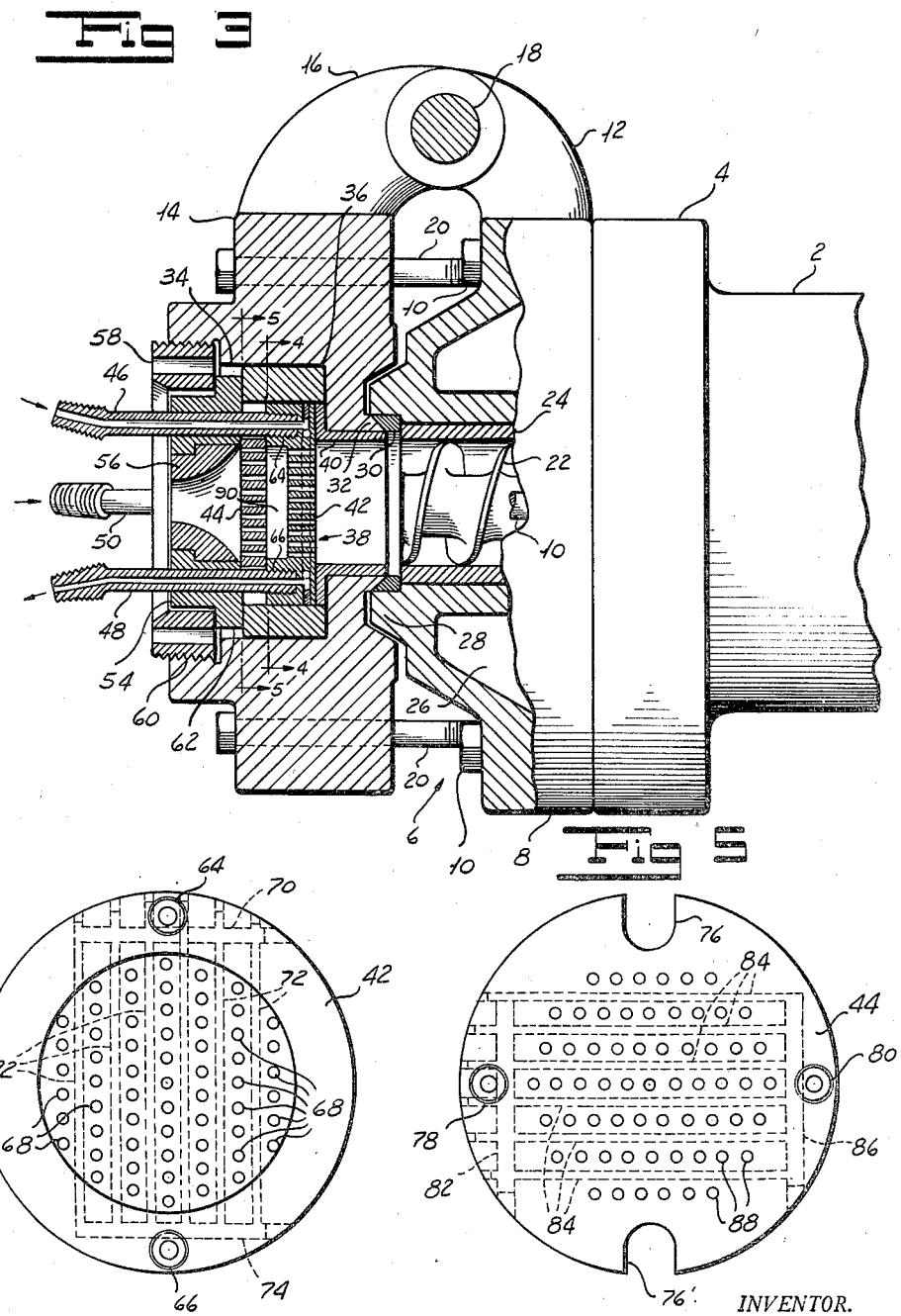
INVENTOR.
JURIAN W. VAN RIPER
BY
Alfred W. Vibber
ATTORNEY Patented Feb. 27, 1951

2,543,679

UNITED STATES PATENT OFFICE 2,543,679

EXTRUSION APPARATUS

Jurian W. Van Riper, Fairlawn, N. J.

Application November 27, 1948, Serial No. 62,279

7 Claims. (Cl. 18—12)

This invention relates to improved extrusion apparatus of the type which works and die expresses plastic materials of which rubber and the so-called plastics are typical.

The invention has among its objects the provision of apparatus for working and extruding plastic materials of the type indicated whereby the material is worked under substantially uniform conditions prior to its extrusion through the die.

A further object of the invention lies in the provision of apparatus for working and extruding plastic materials in which the materials prior to extrusion through the die are held at and/or brought to a substantially uniform temperature throughout the extent of such material.

These and further objects of the invention will be more readily apparent in the following description of a preferred embodiment of the extrusion apparatus in accordance therewith.

In the working and extruding of plastic materials, of which natural rubber, the so-called synthetic rubbers, and synthetic thermoplastic plastic materials are typical, it is necessary to subject the materials to a considerable amount of working before they reach suitable condition for extrusion. Such treatment per se of the materials aids in plasticizing and/or mixing them. An important factor, however, in attaining the desired state of the material prior to extrusion is their heating which heretofore has been obtained largely through the heat generated from the working of the materials themselves. Such heating, of course, has not been an independent variable since it depends directly on the working. Furthermore, the material has usually been heated to markedly varying degrees throughout its mass, the material near the center of the worked mass prior to its entry into the extrusion die being heated to a temperature quite different from that of those portions of the mass lying adjacent the wall of the bore in the extrusion apparatus leading to the die.

The apparatus of the invention provides means whereby the temperature of the worked mass in advance of the extrusion die may be held at substantially uniform temperature throughout its extent transversely of its line of travel. The means for thus controlling the temperature of the worked mass of material functions independently of the working of the material, and thus the mass of plastic material to be extruded may be brought to any desired substantially uniform temperature throughout its extent. Although in the illustrative embodiment such temperature controlling means heats the worked mass to a desired temperature, it is to be understood that it may, in some instances, advantageously be employed to abstract heat from the mass and thus to cool it to a substantially uniform temperature throughout its extent.

Besides exercising control over the temperature of the mass of material to be extruded, the apparatus of the invention further provides for the thorough and substantially uniform working of the mass of material immediately prior to extrusion, so that such material as it enters the die is in substantially uniform condition both as to its temperature and amount of working to which it has been subjected throughout planes transverse to its path of travel.

The invention will be more readily understood by reference to the accompanying drawings forming a part of the specification, in which:

Figure 1 is a view in side elevation of the extrusion head and an adjacent portion of the barrel of a direct delivery continuous extruding machine in which the apparatus of the present invention is incorporated;

Figure 2 is a view in front elevation of the apparatus of Figure 1, the view being taken from line 2—2 in Figure 1;

Figure 3 is a view partially in horizontal section and partially in plan of the device shown in Figures 1 and 2, the section being taken along the line 3—3 in Figure 2;

Figure 4 is a view in elevation of the first, rear, breaker plate shown in Figure 3, the view being taken from the line 4—4 in Figure 3; and Figure 5 is a view in elevation of the second, front, breaker plate shown in Figure 3, the view being taken from the line 5—5 in Figure 3.

In Figures 1, 2, and 3 there is shown the front delivery end of a direct delivery continuous extruding machine of the stock screw type. A portion of the barrel 2 of such machine is shown, such barrel housing a stock screw 22 of which a portion is shown in Figure 3, and having in its rear portion (not shown) a conventional feed hopper and a stock screw driving mechanism, neither of which is shown. Barrel 2 has on its forward end a flange 4 to which is secured an extrusion head, generally designated 6, by means of the flange 8 on the rear end of the extrusion head and the bolts 10 which extend through holes in flange 8 into tapped openings in flange 4.

The extrusion head shown is of the hinged type, flange 8 having integral horizontally extending ears 12. Two such ears are swingably connected to the die holder 14, such die holder having horizontally extending ears 16 vertically spaced so as to lie outside of ears 12. A vertical pintle pin 18 extends through vertical openings in ears 12 and 16 to complete such hinged connection, which is employed to support the die holder 14 when the latter is removed from operative relationship with the other parts of the extruding mechanism as, for instance, when it is necessary to change the extruding die. The axial thrust upon die holder 14 is sustained, during operation, by the bolts 20 which extend through openings in member 14 into tapped holes in part 8.

The stock screw 22 mentioned above, which is of conventional design, extends longitudinally of the barrel 2 and of the rear portion of the extruding head in a bore (not shown) in barrel 2 and in a bore forming an extension thereof provided in the rear of the extruding head. The extruding head is shown provided with a cylindrical liner 24, the stock screw closely fitting the inner surface of such liner. The bore in barrel 2 is provided with a similar liner. The rear portion of the extruding head is provided with a temperature controlling fluid receiving chamber 26, which is supplied and exhausted through means not shown. In the preferred embodiment of the apparatus, in which the material to be extruded is heated, chamber 26 will be supplied with heating fluid such as hot oil delivered at a controlled predetermined temperature.

A tight seal between the rear fixed portion of the extruding head and the die holding portion 14 is provided by means of the centrally located conical projection 28 on the forward face of the rear fixed portion of the extruding head, such projection carrying on its radially inner surface a sealing wear ring 30. Ring 30 cooperates with the centrally located conical seat 32 on the rear surface of die holder 14.

The breaker plate assembly which, per se and in combination with the other elements of the apparatus, constitutes the novel feature of the invention, is located in the forwardly facing axial counterbore 34 in die holder 14. The breaker plate assembly includes the annular spacer member 36 accurately fitting the counterbore 34 as shown, member 36 carrying within it the assembly consisting of the first, or rear, breaker plate 42 and the second, or front, breaker plate 44. A flanged sleeve 40 is positioned with its cylindrical portion tightly engaging the bore in the die holder to the rear of the breaker plate assembly, the flange on the sleeve extending radially between the rear outer surface of the first breaker plate and the rear radial surface of counterbore 34.

The structure of the breaker plates will be more fully described in connection with Figures 4 and 5. For the moment it will suffice to describe each of the breaker plates as having a plurality of apertures therethrough parallel to the axis of the stock screw through which the material to be extruded passes, and a plurality of temperature controlling fluid receiving passages isolated from the material receiving apertures. The rear breaker plate 42 is supplied with temperature controlling fluid, in this instance, hot oil from a separate source, through the pipe 46 before being exhausted from plate 42 through the pipe 48. The forward breaker plate is supplied with temperature controlling fluid, likewise, in this instance hot oil from a different separate source, through pipe 50, the fluid being exhausted therefrom through pipe 52. The temperature controlling fluid supplied to each breaker plate is preferably fed through its separate thermostatically controlled means (not shown) whereby each plate is maintained at a predetermined temperature.

The breaker plate assembly is retained in the die holder by means of the member 54 which also functions to retain the extruding die 56, as shown in Figure 3. Member 54 has on its outer edge four equally spaced radial slots extending from its outer edge to receive pipes 46, 48, 50, and 52, as shown in Figure 2. Member 54 is held in place in the die holder by means of the retaining annulus 58, the peripheral threaded surface of which threadedly engages the inner wall of the outer counterbore 60 on the die holder. Member 58 engages, at its rear surface, the radial flange on member 54 and thus thrusts such flange and members 36, 42, and 44 into counterbore 34.

Breaker plates 42 and 44 are more clearly shown in Figures 4 and 5, respectively. The rear breaker plate 42 is of shallow cup shape as shown, and is provided in its side edges with two diametrically opposed internally threaded bores 64 and 66 which respectively receive the rear threaded ends of pipes 46 and 48. The orientation of the parts of the breaker plates will be described herein with reference to their actual location in the apparatus. The plastic material receiving apertures 68 in breaker plate 42 in the embodiment shown, extend normal to the broad surfaces of the plate and are located within its central, working area, which is of circular form and has a diameter approximately equal to that of the stock screw. Apertures 68 are located in a plurality of horizontal rows, such rows being spaced substantially equally from each other in a vertical direction, the holes, which are all of the same diameter, being substantially uniformly distributed over the entire central working area of the plate. In each of such horizontal rows the adjacent holes are spaced uniformly from each other. In adjacent horizontal rows of apertures the holes are staggered with respect to each other, so that the holes in one row lie between and equidistant from the two nearest holes in the other row. As a result of such spacing the apertures are distributed substantially uniformly over the central working area of the plate, as shown.

Plate 42 is provided with a plurality of temperature controlling fluid conducting passages 72 which extend parallel to the broad surfaces of the plate, and which are parallel to each other. Passages 72 are located between and equidistant from each pair of adjacent horizontal rows of apertures 68. Passages 72 are connected to the inner end of pipe 46 at bore 64 by means of the vertical bore 70, which acts as a manifold. The inner ends of passages 72 are connected to the inner end of pipe 48 at bore 66 by means of vertical bore 74 also acting as a manifold. In the embodiment shown, passages 70, 72, and 74 are formed in the breaker plate by drilling, the ends of the bores through which the drill has entered being subsequently plugged, as shown.

By reason of the uniformity of spacing between the plastic material conducting apertures 68 in the breaker plate 42 and the temperature controlling medium conducting passages in the breaker plate, the wall of each aperture 68 is brought to and maintained at a temperature which, in the main, is uniform throughout, such temperature of any one aperture wall being substantially the same as that of any other. In an illustrative embodiment, in an extruding machine having a stock screw with a 2" diameter the apertures 68 are 3/32" in diameter and the passages 72 are also 3/32" in diameter. The sizes of the apertures and their number, as well as the size of the fluid receiving passages, are dependent upon considerations of mechanical strength of the breaker plate as well as upon the severity of working of the plastic material desired and the degree of approach to absolute uniformity of temperature throughout the plastic mass desired. Ordinarily, in the working of materials of the class indicated the material conducting apertures in the horizontal rows of apertures in the plate will be spaced from 1/4 to 1 × their diameter apart, and the walls of the temperature controlling fluid passages will be spaced from 1/2 to 1 diameter of such apertures from the wall of any aperture. As will be apparent in Fig. 3, the breaker plates 42 and 44 have substantially equal broad central working areas transverse to the passage in the extrusion head beyond the stock screw. Each plate is thin as compared to the diameter of such passage, the thickness of each such plate also being a small fraction of the diameter of its broad central working area.

The forward breaker plate 44 is provided on its diametrically opposed horizontal edges with two slots 76 and 76' which receive pipes 46 and 48, respectively. The plate is further provided at its top and bottom edges with internally threaded bores 80 and 78, respectively, receiving the threaded forward ends of pipes 52 and 50, respectively. Such plate is provided with a plurality of plastic material conducting apertures 88 in its central working area, such apertures being located in a plurality of vertical rows, the apertures in each such vertical row being spaced uniformly from each other. The plate is also provided with a plurality of spaced parallel temperature controlling fluid receiving passages 84 which extend parallel to the broad surfaces of the plate and are located equidistant between the vertical rows of apertures. Passages 84 are supplied with fluid from pipe 78 through the horizontal manifold passage 82, the passages being connected at their upper ends with the horizontal manifold providing bore 86 through which the fluid is exhausted to pipe 52. Passages 84 are spaced with respect to openings 88 in breaker plate 44 in the same manner as the holes 68 in plate 42 are spaced with respect to passages 72.

It is preferred that as few as possible, and preferably none, of the apertures 88 in plate 44 are aligned with the apertures 68 in plate 42 in an axial direction, and it is preferred that any pair of the apertures 88 and 68 overlap, if at all, to a minimum. In the embodiment shown, apertures 88, in general, are not aligned with and do not overlap apertures 68, thereby forcing the plastic material passing through any one of the apertures 68 to be substantially diverted in its path of travel before passing through an aperture 88. This is accomplished, in the illustrative embodiment, by positioning the apertures 68 in plate 42 in horizontal rows, as described, and the apertures 88 in plate 44 in vertical rows.

It is also preferred to space plates 42 and 44 a material distance apart along the path of travel of the material, to allow sufficient space between them for the streams of material passing through apertures 68 in plate 42 to unite and coalesce before they pass through the apertures 88 in plate 44. In the embodiment shown, the space 90 between the breaker plates is of a width roughly equal to the thickness of either breaker plate. As has been explained above, the central, working, area of breaker plate 42 has a diameter approximately equal to that of the stock screw. The second breaker plate shown, plate 44, has a central, working, area substantially equal to that of plate 42 as is clearly evident in Figs. 3, 4, and 5. The space 90 between plates 42 and 44, in the preferred illustrated embodiment, is of a diameter slightly in excess of the central, working, area of both breaker plates. As a result of such construction, the plastic material issuing from the apertures in plate 44 and entering the die 56 is in intimately worked, thoroughly mixed, condition, and, as stated, is at a substantially uniform temperature through its extent. By reason of the maintenance of the area of flow between breaker plates with a diameter substantially the same as that of the central, working area of the plates the material being worked passes from a high pressure condition at the right of plate 42 (Fig. 3) to a low pressure condition immediately at the left of plate 42, being accelerated as it passes into the low pressure zone. As a result marked turbulence of the material occurs in space 90, whereby the material is thoroughly mixed in space 90. Passage of the material from space 90 through plate 44 still further mixes and homogenizes it.

Although the illustrated embodiment of the apparatus incorporates two spaced breaker plates of the described construction, in some applications but one such plate has been found necessary. Thus, where a large amount of working of the material is not necessary, one breaker plate provides sufficient working and temperature control of the plastic material to be extruded. As a corollary, where a large amount of working of the material and a very close control of its temperature are desired, it is beneficial to provide three or even four breaker plates of the described construction in spaced serial arrangement in the space through which the plastic material is impelled toward the extrusion die.

Whereas I have shown and illustrated a preferred embodiment of the extrusion apparatus of my invention, it is to be understood that such embodiment is illustrative only and that the invention is capable of considerable variation as to details. The invention is therefore to be defined by the scope of the appended claims.

I claim as new the following:

1. Apparatus comprising mechanism for working plastic material and forwarding it under pressure, an extrusion head including a passage and an extrusion die at the end of such passage remote from said mechanism, the mechanism feeding such worked material through the passage to the die, said extrusion head including a thin breaker plate disposed in the passage transverse to the length thereof, the breaker plate having a broad working area substantially equal in area to that of the passage, the breaker plate having a thickness which is a small fraction of any transverse dimension of the passage, the breaker plate being in the form of a disc having substantially parallel outer broad surfaces, the breaker plate having a plurality of substantially similar plastic material conducting apertures therethrough substantially uniformly spaced over the broad working area thereof and positioned generally transverse to such broad area, the apertures being located in a plurality of substantially equally spaced parallel rows, the apertures in each row being substantially equally spaced from each other, the breaker plate having a plurality of substantially similar substantially parallel temperature controlling fluid receiving passages therein separated from the material conducting apertures, the passages lying generally in the same plane and extending parallel to the broad outer surfaces of the breaker plate, one such passage being located substantially equidistant from and between each adjacent pair of rows of apertures, whereby the plastic material passing through the apertures in the breaker plate is brought to a substantially uniform temperature throughout its extent transverse to its direction of travel.

2. Apparatus comprising mechanism for working plastic material and forwarding it under pressure, an extrusion head including a circular cylindrical passage and an extrusion die at the end of such passage remote from said mechanism, the mechanism feeding such worked material through the passage to the die, said extrusion head including a thin breaker plate disposed in the passage transverse to the length thereof, the breaker plate having a broad working area substantially equal in area to that of the passage, the breaker plate having a thickness which is a small fraction of the diameter of the passage, the breaker plate being in the form of a disc having substantially parallel outer broad surfaces, the breaker plate having a plurality of substantially similar plastic material conducting apertures therethrough substantially uniformly spaced over the broad working area thereof and positioned generally transverse to such broad area, the apertures being located in a plurality of substantally equally spaced parallel rows, the apertures in each row being substantially equally spaced from each other, the breaker plate having a plurality of substantially similar substantially parallel temperature controlling fluid receiving passages therein separated from the material conducting apertures, the passages lying generally in same plane and extending parallel to the broad surfaces of the breaker plate, one such passage being located substantially equidistant from and between each adjacent pair of rows of apertures, means to feed temperature controlling fluid into the passages at one end of each, and means to exhaust such temperature controlling fluid from the other end of each of the passages, whereby the plastic material passing through the apertures in the breaker plate is brought to a substantially uniform temperature throughout its extent transverse to its direction of travel.

3. The combination of an extrusion device having mechanism for working plastic material and forwarding it under pressure, an extrusion head including a passage and an extrusion die at the end of such passage remote from said mechanism, the mechanism feeding such worked material through the passage to the die, said extrusion head including at least two similar thin breaker plates disposed sequentially in the passage transverse to the length thereof and between the mechanism and the die, the breaker plates having substantially equal working areas which are substantially equal in area to that of the passage, each breaker plate having a thickness which is a small fraction of any transverse dimension of the passage, each breaker plate being in the form of a disc having substantially parallel outer broad surfaces, each such breaker plate having a plurality of plastic material conducting apertures therethrough spaced substantially uniformly over, and disposed substantially normal to, the broad working area thereof, each breaker plate having a plurality of temperature controlling fluid receiving passages therein separated from the material conducting apertures, the passages extending parallel to the broad surfaces of the breaker plate and being distributed substantially uniformly throughout the body thereof, the breaker plates being spaced from each other along the path of travel of the plastic material to the die a distance which is on the order of the thickness of one of the breaker plates.

4. The combination of an extrusion device having mechanism for working plastic material and forwarding it under pressure, an extrusion head including a passage and an extrusion die at the end of such passage remote from said mechanism, the mechanism feeding such worked material through the passage to the die, said extrusion head including at least two similar thin breaker plates disposed sequentially in the passage transverse to the length thereof and between the mechanism and the die, the breaker plates having substantially equal working areas which are substantially equal in area to that of the passage, each breaker plate having a thickness which is a small fraction of any transverse dimension of the passage, each breaker plate being in the form of a disc having substantially parallel outer broad surfaces, each such breaker plate having a plurality of plastic material conducting apertures therethrough spaced substantially uniformly over, and disposed substantially normal to, the broad working area thereof, each breaker plate having a plurality of temperature controlling fluid receiving passages therein separated from the material conducting apertures, the passages extending parallel to the broad surfaces of the breaker plate and being distributed substantially uniformly throughout the body thereof, the breaker plates being spaced from each other along the path of travel of the plastic material to the die a distance which is roughly equal to the thickness of one of the breaker plates.

5. The combination of an extrusion device having mechanism for working plastic material and forwarding it under pressure, an extrusion head including a passage and an extrusion die at the end of such passage remote from said mechanism, the mechanism feeding such worked material through the passage to the die, said extrusion head including at least two similar thin breaker plates disposed sequentially in the passage transverse to the length thereof and between the mechanism and the die, the breaker plates having substantially equal working areas which are substantially equal in area to that of the passage, each breaker plate having a thickness which is a small fraction of any transverse dimension of the passage, each breaker plate being in the form of a disc having substantially parallel outer broad surfaces, each such breaker plate having a plurality of plastic material conducting apertures therethrough spaced substantially uniformly over, and disposed substantially normal to, the broad working area thereof, each breaker plate having a plurality of temperature controlling fluid receiving passages therein separated from the material conducting apertures, the passages extending parallel to the broad surfaces of the breaker plate and being distributed substantially uniformly throughout the body thereof, the breaker plates being spaced from each other along the path of travel of the plastic material to the die a distance which is on the order of the thickness of one of the breaker plates, the apertures in the breaker plate nearer the die being in the main offset from those in the first breaker plate, whereby the straight line passage of plastic material sequentially through both breaker plates is substantially prevented.

6. The combination of an extrusion device having mechanism for working plastic material and forwarding it under pressure, an extrusion head including a passage and an extrusion die at the end of such passage remote from said mechanism, the mechanism feeding such worked material through the passage to the die, said extrusion head including at least two similar thin breaker plates disposed sequentially in the passage transverse to the length thereof and between mechanism and the die, the breaker plates having substantially equal working areas which are substantially equal in area to that of the passage, each breaker plate having a thickness which is a small fraction of any transverse dimension of the passage, each breaker plate being in the form of a disc having substantially parallel outer broad surfaces, each breaker plate having a plurality of plastic material conducting apertures therethrough spaced over the broad working area thereof and positioned generally transverse to such broad area, the apertures in each plate being located in a plurality of substantially equally spaced parallel rows, the apertures in each row being substantially equally spaced from each other, each breaker plate having a plurality of substantially parallel temperature controlling fluid receiving passages therein separated from the material conducting apertures, the passages extending parallel to the broad surfaces of the breaker plate, one such passage being located substantially equidistant from and between each adjacent pair of rows of apertures, the breaker plates being spaced from each other along the path of travel of the plastic material to the die a distance which is roughly equal to the thickness of one of the breaker plates, independent means for supplying temperature controlling fluid to each of the breaker plates, and means for exhausting such fluid from each of the breaker plates.

7. The combination of an extrusion device having mechanism for working plastic material and forwarding it under pressure, an extrusion head including a passage and an extrusion die at the end of such passage remote from said mechanism, the mechanism feeding such worked material through the passage to the die, said extrusion head including at least two similar thin breaker plates disposed sequentially in the passage transverse to the length thereof and between the mechanism and the die, the breaker plates having substantially equal working areas which are substantially equal in area to that of the passage, each breaker plate having a thickness which is a small fraction of any transverse dimension of the passage, each breaker plate being in the form of a disc having substantially parallel outer broad surfaces, each breaker plate having a plurality of plastic material conducting apertures therethrough spaced over the broad working area thereof and positioned generally transverse to such broad area, the apertures in each plate being located in a plurality of substantially equally spaced parallel rows, the apertures in each row being substantially equally spaced from each other, each breaker plate having a plurality of substantially parallel temperature controlling fluid receiving passages therein separated from the material conducting apertures, the passages extending parallel to the broad surfaces of the breaker plate, one such passage being located substantially equidistant from and between each adjacent pair of rows of apertures, the breaker plates being spaced from each other along the path of travel of the plastic material to the die a distance which is roughly equal to the thickness of one of the breaker plates to provide a plastic material coalescing space, independent means for supplying temperature controlling fluid to each of the breaker plates, and means for exhausting such fluid from each of the breaker plates, the apertures in the second breaker plate nearer the die being in the main offset from those in the first breaker plate, whereby the straight line passage of plastic material sequentially through both breaker plates is substantially prevented.

JURIAN W. VAN RIPER.

REFERENCES CITED

The following references are of record in the file of this patent:

UNITED STATES PATENTS

| Number | Name | Date |
|---|---|---|
| 1,163,740 | Cohoe | Dec. 14, 1915 |
| 1,375,623 | Bartels | Apr. 19, 1921 |
| 1,560,368 | Bartels et al. | Nov. 3, 1925 |
| 2,262,989 | Conklin et al. | Nov. 18, 1941 |
| 2,291,212 | Clinefelter | July 28, 1942 |
| 2,373,939 | Bailey | Apr. 17, 1945 |